United States Patent [19]

Sunagawa et al.

[11] Patent Number: 4,816,679
[45] Date of Patent: Mar. 28, 1989

[54] RADIATION IMAGE READ-OUT APPARATUS

[75] Inventors: Hiroshi Sunagawa; Kazuhiro Kawajiri; Nobuharu Nozaki; Yuichi Hosoi; Kenji Takahashi, all of Kanagawa, Japan

[73] Assignee: Fuji Photo Film Co., Ltd., Kanagawa, Japan

[21] Appl. No.: 731,243

[22] Filed: May 7, 1985

[30] Foreign Application Priority Data

May 9, 1984 [JP] Japan .............................. 92627/1984

[51] Int. Cl.$^4$ ................................................ G03C 5/16
[52] U.S. Cl. .............................. 250/327.2; 250/484.1
[58] Field of Search .......................... 250/484.1, 327.2; 378/146

[56] References Cited

U.S. PATENT DOCUMENTS 4,472,822  9/1984  Swift ................................... 378/146
4,631,407  12/1986  Kawajiri et al. ................... 250/327.2

FOREIGN PATENT DOCUMENTS 0123942  11/1984  European Pat. Off. ......... 250/327.2

OTHER PUBLICATIONS

Keller, S. "Storage Device using Phosphorus" IBM Tech Disclosure Bull. vol. 1 No. 1 Jun-1958.

Primary Examiner—Carolyn E. Fields
Assistant Examiner—Richard Hanig
Attorney, Agent, or Firm—Sughrue, Mion, Zinn, Macpeak & Seas

[57] ABSTRACT

A radiation image read-out apparatus comprises a stimulating ray source constituted by many point light sources for sequentially emitting stimulating rays onto a portion of a stimulable phosphor sheet carrying a radiation image stored therein, and a line sensor constituted by many solid state photoelectric conversion devices. The line sensor extends over the length of the portion of the stimulable phosphor sheet linearly exposed to stimulating rays. Light emitted by the exposed portion of the stimulable phosphor sheet is received and photoelectrically converted by the solid state photoelectric conversion devices. The stimulating ray source and the line sensor are moved with respect to the stimulable phosphor sheet in a main scanning direction normal to the array of the solid state photoelectric conversion devices, and then moved with respect thereto in the array direction each time one main scanning step is finished.

4 Claims, 1 Drawing Sheet

RADIATION IMAGE READ-OUT APPARATUS

BACKGROUND OF THE INVENTION

1. Field of the Invention

This invention relates to a radiation image read-out apparatus for exposing a stimulable phosphor carrying a radiation image stored therein to stimulating rays which cause the stimulable phosphor to emit light in proportion to the stored radiation energy, and detecting the emitted light for obtaining an image signal. This invention particularly relates to a radiation image read-out apparatus wherein a stimulating ray source for linearly emitting stimulating rays is used, and a line sensor comprising many solid state photoelectric conversion devices is used as a photodetector for receiving and photoelectrically converting light emitted by the stimulable phosphor sheet.

2. Description of the Prior Art

A novel radiation image recording and reproducing system is disclosed, for example, in U.S. Pat. No. 3,859,527. The system comprises (i) exposing a stimulable phosphor sheet to a radiation passing through an object such as the human body to have a radiation image stored therein, (ii) scanning the stimulable phosphor sheet by stimulating rays which cause it to emit light in proportion to the radiation energy stored, (iii) detecting the emitted light and converting it into an electric image signal by use of a photodetector, and (iv) reproducing a visible image by use of the electric image signal.

In the aforesaid radiation image recording and reproducing system, during image read-out, a semi-transparent mirror is positioned at an angle of 45° with respect to the stimulable phosphor sheet, and stimulating rays are made to pass through the semi-transparent mirror from the back thereof and to impinge upon the stimulable phosphor sheet. Light emitted by the stimulable phosphor sheet in proportion to the stored radiation energy when it is exposed to stimulating rays is laterally reflected by the semi-transparent mirror and is received by an image intensifier tube or a photomultiplier. Alternatively, stimulating rays are emitted from the rear surface of the stimulable phosphor sheet via an aperture, and light emitted by the front surface of the stimulable phosphor sheet is laterally reflected by a prism and received by an image intensifier tube. However, since the semitransparent mirror or the prism is positioned in far spaced relation to the stimulable phosphor sheet, it is not always possible to efficiently guide the light emitted by the stimulable phosphor sheet, which is non-directional and weak.

On the other hand, Japanese Unexamined Patent Publication No. 58(1983)-121874 discloses an X-ray image converter comprising a light sensor utilizing a photoconductive semiconductor instead of a photomultiplier or an image intensifier tube, the light sensor being overlaid on the whole surface of the stimulable phosphor sheet. The light sensor comprises two transparent electrodes, which may be divided into parallel strip-like portions, and the photoconductive semiconductor is sandwiched therebetween. Image read-out is conducted by scanning the stimulable phosphor sheet by stimulating rays made to impinge upon the sheet from the outside via the light sensor. Or, an array of light emitting diodes exhibiting a spectrum of stimulating rays are positioned over the whole surface of the light sensor, and the light emitting diodes are sequentially turned on to emit light for scanning the stimulable phosphor sheet. In the X-ray image converter, since the semiconductor layer is directly overlaid on the stimulable phosphor sheet, the possibility of a light receiving loss, i.e. of a loss of light emitted by the stimulable phosphor sheet in the space between the light receiving device and the stimulable phosphor sheet, is decreased. Therefore, it would be expected that the signal-to-noise ratio would increase.

However, actually, since the light sensor is overlaid on the whole surface of the stimulable phosphor sheet, the aforesaid X-ray image converter has the drawbacks as described below.

(a) The photoconductive semiconductor is deteriorated when the stimulable phosphor sheet is subjected to noise erasing necessary for repeatedly using the stimulable phosphor sheet. (When the stimulable phosphor sheet is used repeatedly, radiation energy which remains on the stimulable phosphor sheet after the image read-out step and which constitutes noise in the next image recording and read-out is erased. Normally, noise erasing is conducted by exposing the stimulable phosphor sheet to a large amount of erasing light having a wavelength within the stimulating ray spectrum. Being exposed to the large amount of erasing light repeatedly, the semiconductor is deteriorated.)

(b) Since the weight and the volume of each stimulable phosphor sheet become large, the stimulable phosphor sheet becomes inconvenient for handling.

(c) It is not always possible to actually overlay the light sensor on the whole surface of the stimulable phosphor sheet and to install the light emitting diode array over the whole surface thereof. Even when such a configuration can be realized, the cost of realizing the configuration is high.

(d) Even when the transparent electrodes are divided into parallel strip-like portions, the electrode area is still large. Therefore, a large dark current inevitably arises, and the capacitance is large. As a result, the signal-to-noise ratio cannot be improved so much.

Also, Japanese Unexamined Patent Publication No. 58(1983)-67241 discloses that, instead of the laser generally used as the stimulating ray source, a light emitting diode array may be used for scanning, and that a plurality of photomultipliers or photo-transistors arrayed along a straight line in the main scanning direction may be used as a photodetector. However, in this technique, since the stimulating ray source or the photodetector becomes large, it is not always possible to fabricate the apparatus, and the cost of fabrication is high.

SUMMARY OF THE INVENTION

The primary object of the present invention is to provide a radiation image read-out apparatus which generates image signals at a high signal-to-noise ratio.

Another object of the present invention is to provide a radiation image read-out apparatus which is easy to fabricate and handle and which can be made at a low cost.

The present invention provides a radiation image read-out apparatus comprising:

(i) a stimulating ray source comprising a plurality of point stimulating ray sources linearly positioned in association with each other at a portion of a stimulable phosphor sheet carrying a radiation image stored therein, each of said point stimulating ray sources emitting stimulating rays onto a point at said portion of said stimulable phosphor sheet, (ii) a line sensor comprising a plurality of solid state photoelectric conversion devices corresponding to respective pixels and linearly arrayed in association with each other for sequentially receiving and photoelectrically converting light emitted by said stimulable phosphor sheet in proportion to the stored radiation energy upon point-wise exposure to said stimulating rays, said line sensor extending over the length of said portion of said stimulable phosphor sheet linearly exposed to said stimulating rays by sequential point-wise exposures to said stimulating rays emitted by said stimulating ray source so as to stand face to face with said linearly exposed portion of said stimulable phosphor sheet, (iii) a main scanning drive means for conducting main scanning by moving said stimulating ray source and said line sensor with respect to said stimulable phosphor sheet along the surface of said stimulable phosphor sheet normal to the array direction of said solid state photoelectric conversion devices, and (iv) a sub-scanning means for conducting sub-scanning by moving said stimulating ray source and said line sensor with respect to said stimulable phosphor sheet by a distance equal to the length of said linearly exposed portion of said stimulable phosphor sheet in said array direction of said solid state photoelectric conversion devices each time one main scanning step is finished.

In the radiation image read-out apparatus of the present invention, since no reflecting member such as a semitransparent mirror or a prism need be used, it is possible to make the light receiving solid angle large. Therefore, it is possible to improve the signal-to-noise ratio. Also, since the solid state photoelectric conversion devices constituting the line sensor are divided in accordance with pixels (picture elements) and have small areas, the dark current is small and the capacitance is small. Accordingly, it is possible to obtain a high signal-to-noise ratio.

Further, since the line sensor is separate from the stimulable phosphor sheet, the stimulable phosphor sheet is easy to handle, and noise erasing for repeatedly using the stimulable phosphor sheet can be conducted without deteriorating the photodetector. Also, since the sensor and the stimulating ray source are markedly smaller than those in the apparatus of Japanese Unexamined Patent Publication No. 58(1983)-121874, the radiation image read-out apparatus of the present invention is easy to fabricate and can be made at a low cost. Particularly when the line sensor is fabricated using a crystal substrate, the short line sensor as in the present invention is advantageous from the viewpoint of ease in fabrication.

In this specification, it should be noted that "moving a stimulating ray source and a line sensor with respect to a stimulable phosphor sheet" means movement of the stimulating ray source and the line sensor relative to the stimulable phosphor sheet and includes both the movement of the stimulating ray source and the line sensor with the sheet standing still and the movement of the sheet with the stimulating ray source and the line sensor standing still.

As the stimulating ray source comprising a plurality of point stimulating ray sources, it is possible to use, for example, an array of laser diodes or light emitting diodes. The point stimulating ray sources should preferably be positioned in equally spaced relation to each other along a straight line.

The line sensor is constituted by linearly positioning solid state photoelectric conversion devices such as photoconductors or photodiodes.

In the solid state photoelectric conversion devices, it is necessary to raise electrons from a full band (in the case of an intrinsic semiconductor) or an impurity binding level (in the case of an extrinsic semiconductor) to a conduction band upon reception of energy $h\nu$ of the light emitted by the stimulable phosphor sheet. Therefore, the solid state photoelectric conversion devices must be such that the forbidden gap width (in the case of the intrinsic semiconductor) or the width from the impurity binding level to the conduction band (in the case of the extrinsic semiconductor), i.e. The energy gap Eg, is smaller than the energy $h\nu$.

The stimulating ray source and the line sensor should preferably be parallel with each other and positioned in parallel with the surface of the stimulable phosphor sheet.

The lengths of the stimulating ray source and the line sensor are shorter than the width of the stimulable phosphor sheet. The stimulating ray source and the line sensor are positioned in the length direction of the stimulable phosphor sheet and are moved in the width direction thereof for conducting main scanning. Then, the stimulating ray source and the line sensor are moved in the sub-scanning direction by a distance equal to the lengths thereof. In this manner, scanning in the main scanning direction and scanning in the sub-scanning direction are repeated alternately, and the whole surface of the stimulable phosphor sheet is scanned.

During the scanning in the main scanning direction, point-wise exposure of the stimulable phosphor sheet to stimulating rays and photoelectric conversion by the solid state photoelectric conversion devices standing face to face with the point-wise exposure portion of the stimulable phosphor sheet are sequentially carried out at high speeds in the linear array direction of the solid state photoelectric conversion devices.

BRIEF DESCRIPTION OF THE DRAWINGS

FIG. 1 shows an embodiment of the radiation image read-out apparatus in accordance with the present invention, wherein a stimulating ray source 2 comprising many point stimulating ray sources is positioned below a stimulable phosphor sheet 1 carrying a radiation image stored therein and a line sensor 3 is positioned above the stimulable phosphor sheet 1. The stimulating ray source 2 comprising the point stimulating ray sources extending in the length direction of the stimulable phosphor sheet 1 is positioned under the stimulable phosphor sheet 1, and the line sensor 3 is positioned above the stimulable phosphor sheet 1 so as to stand face to face with the stimulating ray source 2. The line sensor 3 comprises many solid state photoelectric conversion devices 3a arrayed in the length direction of the stimulable phosphor sheet 1 and connected to lead wires 3b for sending out image signals obtained by photoelectric conversion of the devices 3a.

Figure 1:
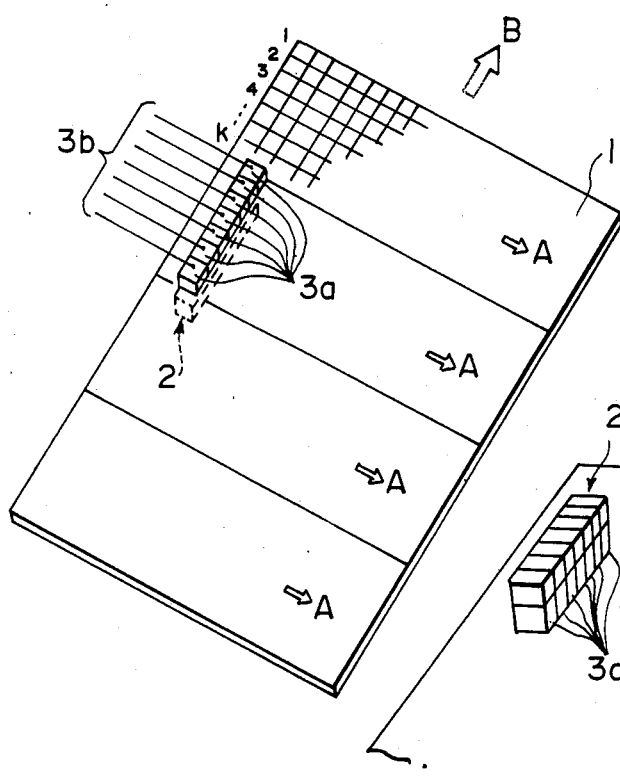
FIG. 1 is a perspective view showing an embodiment of the radiation image read-out apparatus in accordance with the present invention, wherein a stimulating ray source is positioned below a stimulable phosphor sheet and a line sensor is positioned above the stimulable phosphor sheet.

The point stimulating ray sources of the stimulating ray source 2 emit stimulating rays onto respective pixels on the stimulable phosphor sheet 1 in the sequence of, for example, pixels 1, 2, 3, 4, ..., k. Or, the sequential exposure of the stimulable phosphor sheet 1 to stimulating rays may be conducted such that different groups of pixels sufficiently spaced from each other are simultaneously exposed. For example, sequential exposure of pixels 1, 2, ..., k/2 and sequential exposure of pixels k/2+1, k/2+2, ..., k may be conducted simultaneously. The pixels of the stimulable phosphor sheet 1 thus exposed to stimulating rays release the stored radiation energy as light emission, for example, in the sequence of pixels 1, 2, 3, 4, ..., k. The light thus emitted by the stimulable phosphor sheet 1 is sequentially received by the solid state photoelectric conversion devices 3a of the line sensor 3 which generate photocarriers and output signals based on the photocarriers as image signals. Then, the stimulating ray source 2 and the line sensor 3 are moved by a main scanning drive means by one step in the direction as indicated by the arrow A, and the aforesaid exposure is repeated to read out the radiation image in the sequence of, for example, pixels k+1, k+2, k+3, k+4, ..., 2k. In this manner, image read-out is conducted each time the stimulating ray source 2 and the line sensor 3 are moved step by step in the direction as indicated by the arrow A. When the stimulating ray source 2 and the line sensor 3 are moved up to the right end of the stimulable phosphor sheet 1 and one main scanning operation is finished, the stimulable phosphor sheet 1 is moved by a sub-scanning drive means by a distance equal to the lengths of the stimulating ray source 2 and the line sensor 3 in the direction as indicated by the arrow B. Then, the aforesaid read-out operation is repeated. The read-out operation is repeated over the whole surface of the stimulable phosphor sheet 1, and the radiation image stored in the whole surface of the sheet 1 is read out.

Figure 2:
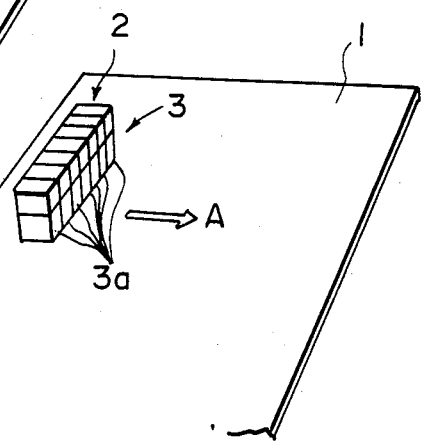
FIG. 2 is a perspective view showing another embodiment of the radiation image read-out apparatus in accordance with the present invention, wherein a line sensor is positioned above a stimulable phosphor sheet and a stimulating ray source is positioned at the back of the line sensor.
Figure 3:
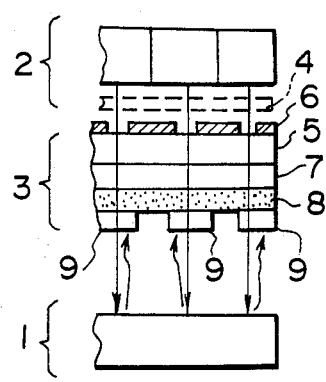
FIG. 3 is a partial sectional front view showing the line sensor and the stimulating ray source in the embodiment of FIG. 2.

FIG. 2 is a perspective view showing another embodiment of the radiation image read-out apparatus in accordance with the present invention, wherein the stimulating ray source 2 is positioned at the back of the line sensor 3 on the same side of the stimulable phosphor sheet 1. FIG. 3 is a partial sectional front view showing the stimulating ray source 2 and the line sensor 3 in the embodiment of FIG. 2. The line sensor 3 uses thin layer photoconductors and is fabricated by stacking a light shielding layer 6 provided with slits or series of small holes, a transparent electrode layer 7, a photoconductor layer 8, and a transparent electrode layer 9 on a transparent substrate 5. By dividing the transparent electrode layer 7 and/or the transparent electrode layer 9 in accordance with pixels, i.e. picture elements, many solid state photoelectric conversion devices corresponding to the pixels are formed in the stack. In FIG. 2, the transparent electrode layer 9 is divided in accordance with the pixels.

The stimulable phosphor sheet 1 carrying a radiation image stored therein is linearly exposed to stimulating rays emitted by the stimulating ray source 2 via the line sensor 3, i.e. via the transparent substrate 5, the slits or series of small holes in the light shielding layer 6, the transparent electrode layer 7, the photoconductor layer 8, and the transparent electrode layer 9. Light emitted by the stimulable phosphor sheet 1 in proportion to the stored radiation energy when it is exposed to stimulating rays is received by the photoconductor layer 8 via the transparent electrode layer 9. The photoconductor layer 8 is constituted by a photoconductor exhibiting an energy gap Eg larger than the energy $hc/\lambda_1$ ($=h\nu_1$) of the stimulating rays and smaller than the energy $hc/\lambda_2$ ($=h\nu_2$) of the light emitted by the stimulable phosphor sheet 1. For example, it is possible to constitute the photoconductor layer 8 by using ZnS, ZnSe, CdS, TiO$_2$, ZnO, or the like when rare earth activated alkaline earth metal fluorohalide phosphor as disclosed in U.S. Pat. No. 4,239,968 is used as the stimulable phosphor.

When the stimulating rays contain a short wave component, a short wave cut filter 4 is inserted between the stimulating ray source 2 and the line sensor 3, thereby passing only a long wave component. The transparent electrode layer 9 (constituted, e.g. by ITO) is divided into very small units in the longitudinal direction of the line sensor 3. The potential difference arising between one divided unit of the transparent electrode layer 9 and the transparent electrode layer 7, i.e. the potential difference generated by accumulation of signals caused by photocarriers generated upon receiving of the light emitted by the stimulable phosphor sheet 1 within the photoconductor layer 8 between the transparent electrode layers 7 and 9, corresponds to an image signal of one pixel. The signals caused by photocarriers, which are obtained at the divided electrode units are time-serially read out by use of a shift register. In this manner, image signals of one scanning line are obtained. The image read-out operation may be conducted approximately in the same manner as described with reference to FIG. 1.

Figure 4:
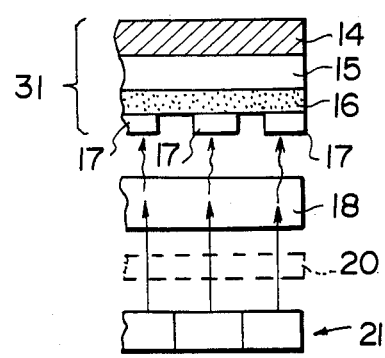
FIG. 4 is a sectional front view showing the stimulating ray source and the line sensor in an embodiment similar to that of FIG. 1.

FIG. 4 is a sectional front view showing the stimulating ray source and the line sensor in an embodiment similar to the embodiment of FIG. 1. Stimulating rays sequentially emitted by a stimulating ray source 21 are made to impinge upon the back surface of a stimulable phosphor sheet 18. Light emitted by the stimulable phosphor sheet 18 when it is exposed to the stimulating rays is sequentially received by a line sensor 31 positioned on the front surface side of the sheet 18 so as to stand face to face with the stimulating ray source 21. The line sensor 31 is fabricated by stacking an electrode layer 15, a photoconductor layer 16, and a divided transparent electrode layer 17 on a light shielding substrate 14.

When the stimulating rays contain a short wave component, a short wave cut filter 20 is inserted between the stimulating ray source 21 and the stimulable phosphor sheet 18, thereby passing only a long wave component. In this embodiment, since the stimulating rays do not pass through the photoconductor layer 16, it is possible to use a photoconductor fabricated of, for example, amorphous SiH, CdS(Cu), ZnS(Al), CdSe, or PbO, which exhibits an energy gap Eg smaller than the energy $hc/\lambda_1$ of the stimulating rays. However, in this case, it is necessary to position a long wave cut filter between the line sensor 31 and the stimulable phosphor sheet 18 so that stimulating rays leaking from the surface of the sheet 18 do not impinge upon the line sensor 31.

In the aforesaid embodiments, photoconductors are used as the solid state photoelectric conversion devices. However, it is also possible to use photodiodes instead of the photoconductors.

As the method of guiding the light emitted by the stimulable phosphor sheet to the solid state photoelectric conversion devices, the line sensor should most preferably be closely contacted with the stimulable phosphor sheet. However, it is also possible to position a micro-lens array or optical fibers in the form of a flat cable between the line sensor and the stimulable phosphor sheet, thereby guiding the light emitted at each pixel to each solid state photoelectric conversion device of the line sensor in one-to-one relation.

The aforesaid light guiding method may be employed also for guiding the stimulating rays from the stimulating ray source to the stimulable phosphor sheet.

We claim:

1. A radiation image read-out apparatus comprising:
   (i) a stimulating ray source comprising a plurality of point stimulating ray sources linearly positioned in association with each other in a sub-scanning direction at a portion of a stimulable phosphor sheet carrying a radiation image stored therein, each of said point stimulating ray sources emitting stimulating rays onto a point at said portion of said stimulable phosphor sheet,
   (ii) a line sensor comprising a plurality of solid state photoelectric conversion devices corresponding to respective pixels and linearly arrayed in association with each other for sequentially receiving and photoelectrically converting light emitted by said stimulable phosphor sheet in proportion to the stored radiation energy upon point-wise exposure to said stimulating rays, said line sensor extending over the length of said portion of said stimulable phosphor sheet linearly exposed to said stimulating rays by sequential point-wise exposures to said stimulating rays emitted by said stimulating ray source so as to stand face to face with said linearly exposed portion of said stimulable phosphor sheet,
   (iii) a main scanning drive means for conducting main scanning by moving said stimulating ray source and said line sensor with respect to said stimulable phosphor sheet in a main scanning direction along the surface of said stimulable phosphor sheet normal to the array direction of said solid state photoelectric conversion devices, and
   (iv) a sub-scanning means for conducting sub-scanning by moving said stimulating ray source and said line sensor in said sub-scanning direction with respect to said stimulable phosphor sheet by a distance equal to the length of said linearly exposed portion of said stimulable phosphor sheet in said array direction of said solid state photoelectric conversion devices each time one main scanning step is finished.

2. An apparatus as defined in claim 1 wherein said stimulating ray source and said line sensor are parallel to each other and positioned in parallel with the surface of said stimulable phosphor sheet.

3. An apparatus as defined in claim 1 wherein said stimulating ray source is positioned under said stimulable phosphor sheet, and said line sensor is positioned above said stimulable phosphor sheet.

4. An apparatus as defined in claim 3 wherein said line sensor is fabricated by stacking an electrode layer, a photoconductor layer, and a divided transparent electrode layer on a light shielding substrate.

5. An apparatus as defined in claim 1 wherein said stimulating ray source is positioned at the back of said line sensor on the same side of said stimulable phosphor sheet.

6. An apparatus as defined in claim 5 wherein said line sensor is fabricated by stacking a light shielding layer provided with slits or small holes, a first transparent electrode layer, a photoconductor layer, and a second transparent electrode layer on a transparent substrate, at least one of said first transparent electrode layer and said second transparent electrode layer being divided into sections each corresponding to one pixel.

* * * * *